Figure 1:
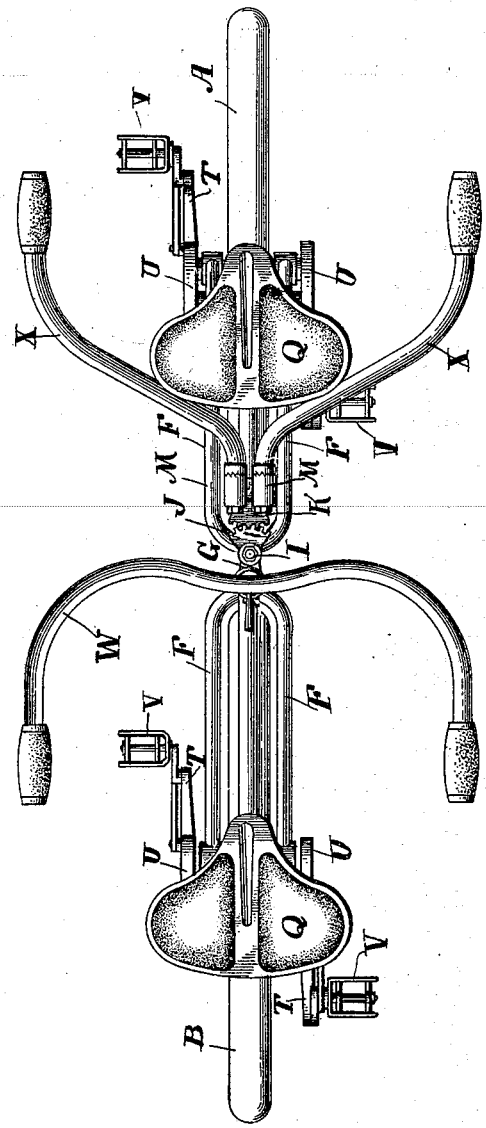

No. 647,786. Patented Apr. 17, 1900.
J. C. ANDERSON.
TANDEM BICYCLE.
(Application filed Aug. 9, 1899.)
(No Model.) 3 Sheets—Sheet 2.
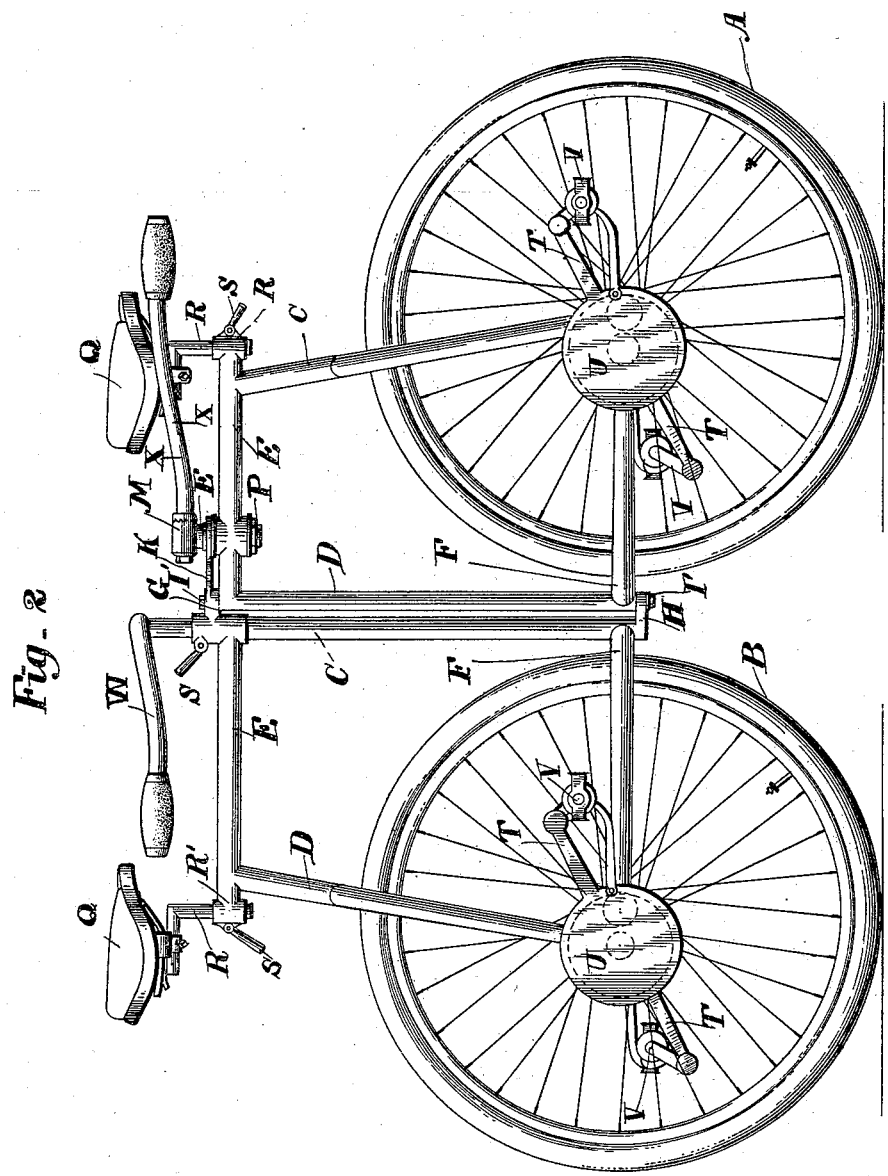

No. 647,786. Patented Apr. 17, 1900.
J. C. ANDERSON.
TANDEM BICYCLE.
(Application filed Aug. 9, 1899.)
(No Model.) 3 Sheets—Sheet 3.
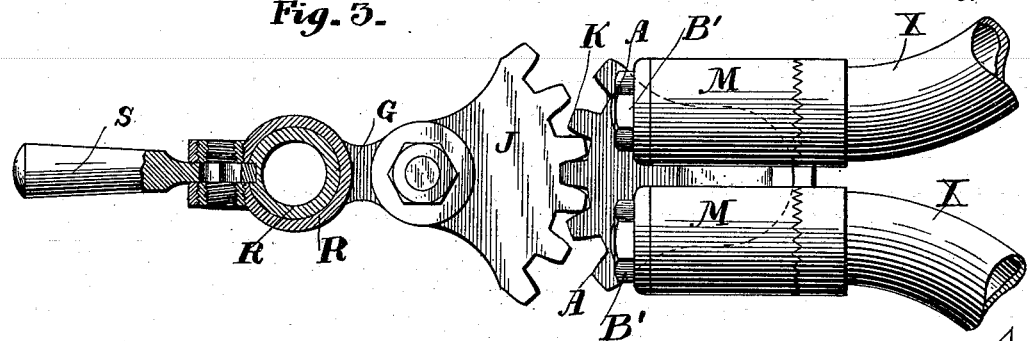
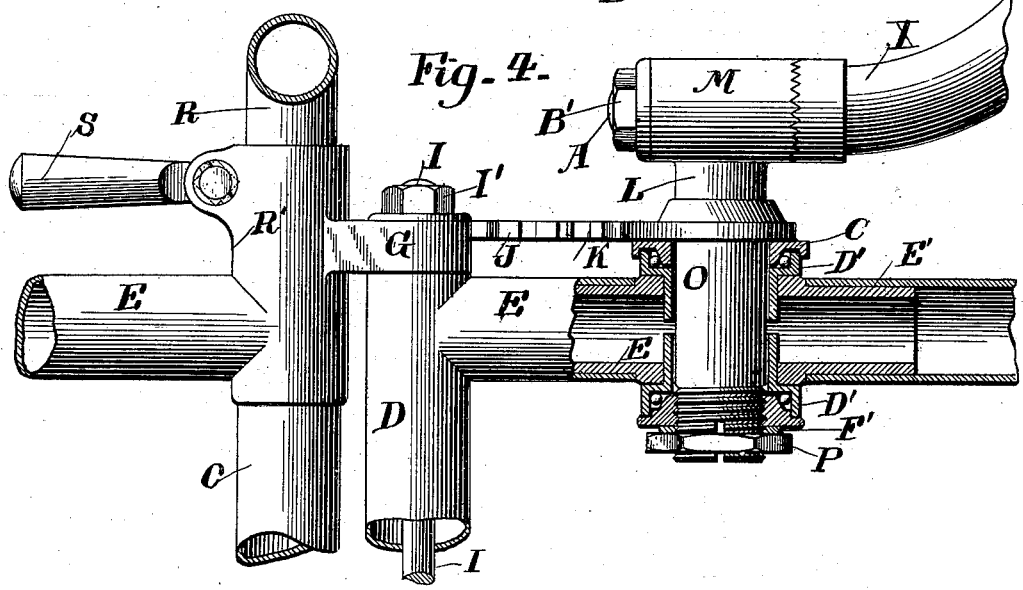
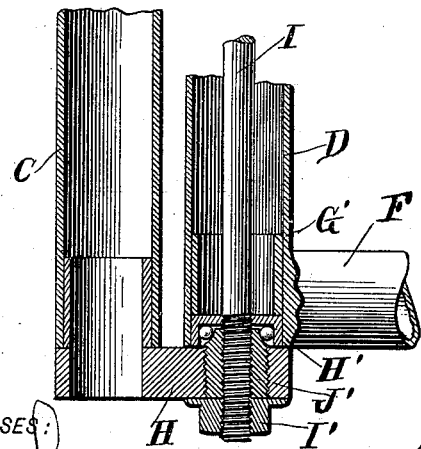
WITNESSES:
INVENTOR
Jas. C. Anderson
BY
ATTORNEY

UNITED STATES PATENT OFFICE.

JAMES C. ANDERSON, OF HIGHLAND PARK, ILLINOIS.

TANDEM BICYCLE.

SPECIFICATION forming part of Letters Patent No. 647,786, dated April 17, 1900.

Application filed August 9, 1899. Serial No. 726,693. (No model.)

*To all whom it may concern:*

Be it known that I, JAMES C. ANDERSON, a citizen of the United States, residing at Highland Park, in the county of Lake and State of Illinois, have invented certain new and useful Improvements in Tandem Bicycles; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to certain new and useful improvements in bicycles, and especially to that class known as "tandems," and which are designed to carry two riders, both of whom coöperate to propel the machine.

In all tandems with which I am familiar the combined physical effort and power of the two riders is applied to a single wheel, or, in other words, only one wheel becomes a driving-wheel, and such wheel is the rear one.

My invention has for its prime object to provide a wheel of such construction that each and both wheels shall be essentially driving-wheels and that the riders shall each be mounted directly over the axis of his respective wheel, and thus be able to apply his power in the most effective manner.

My invention has for another object to provide a novel steering device in tandem construction whereby the front rider controls the path of travel of the wheel over which the rear rider is mounted, and while the steering force is applied to the rear wheel in a direction reverse to that applied to forward wheels in the present form of tandems the handle-bars are so arranged and connected with the steering-gear that the primary direction of the movement of the handle-bar is applied reversely at its rear connection and, finally, in the direction the wheel travels and the same as in wheels of the present type, and hence the forward and steering rider upon any of my improved wheels, applying the same handle-bar movement with which he may have been accustomed, secures the proper trend of the tandem without any confusion to himself.

My invention has for a further object to provide a novel and effective articulative joint between the sections of the frame and also a novel articulative joint between the front handle-bars and the front section.

My invention has for a further object to so construct and arrange the front and steering handle-bars that without in any manner disturbing their ball-bearings the said bars may be readily put in proper position for transportation and quickly restored to operative position.

In an application filed by me on the 16th day of December, 1897, Serial No. 662,233, for improvement in pedal and crank mechanism I have fully explained the most desirable method of applying human motive force to best conserve the natural articulations of the body, and my present invention involves this application of the human motive force. With this object in view the saddles are arranged directly over the axis of each wheel, so that the toggle action of the legs may be applied in the propulsion of the wheel. One of the most important results of this arrangement is that each rider is to all intents mounted upon and operates a unicycle, while by the linking together of the two articulating frames the equilibrium of each is more readily maintained.

In order that those skilled in the art may know how to make and use my improved wheel and fully understand its advantages, I will proceed to describe the same, referring by letters to the accompanying drawings, in which—

Figure 1 is a top or plan view of a tandem bicycle embodying the features of my invention. Fig. 2 is a side elevation of the same. Fig. 3 is a detail top or plan view on increased scale and partly in section, showing the front handle-bar connected with the rear frame; and Fig. 4 is a detail elevation, partly in section, showing the handle-bar connection illustrated at Fig. 3, and also showing the manner of articulatively connecting the two frames of the machine.

Similar letters of reference denote like parts in all the figures of the drawings.

A represents the front, and B the rear, wheel. Each wheel is mounted in a frame consisting of a forward vertical tube C, a rear vertical tube D, and upper and lower horizontal bracing-tubes E F.

The front tube C of the front frame is bifurcated to constitute a fork, in the lower ends of which the wheel A is secured in suitable ball-bearings, and the rear tube D of the rear frame is similarly bifurcated to receive the rear wheel B. The lower horizontal tubes E F are also bifurcated to embrace the wheels.

The front tube of the rear frame is provided with forwardly-projecting lugs G and H at the top and bottom thereof, respectively, and are connected articulatively with the rear tube D of the forward frame by a pintle-rod I, which passes through said lugs and the said rear tube D and is secured in place by nuts I' I' at the upper and lower projecting ends. Suitable ball-bearings are interposed between the ends of rear tube D of the front frame and the lugs G H, as will be presently described; but any other suitable ball-bearings may be employed.

The upper lug G is extended beyond the articulative or pintle joint and is formed into a segmental gear J, (see Fig. 2,) meshing with a similar segmental gear K, extending rearwardly from the neck L of front handle-bar head M. The handle-bar head is formed with a vertical shaft or stem O, which passes through a tubular joint and ball-bearing in the upper frame-tube E and is secured in position by a nut P.

The saddles Q are secured to saddle-posts R, which are securely held in T-joints R' at the front end of the upper tube E of the front frame and at the rear end of the upper tube E of the rear frame and are held in any desirable adjustment by clamping-levers S of any desired form, though I prefer the construction shown in another application filed by me on even date herewith, Serial No. 726,694, covering improvements in bicycles for use in the military service.

The saddle-posts and saddles are arranged, as shown, so that the rider when mounted will be directly over the axis of each wheel, respectively, and may exert his motive force, as heretofore described, and known in mechanics as the "toggle" movement.

T are the cranks and U crank-boxes with internal gears meshing with a pinion on the axis of the driving-wheel, as described in the last-referred-to application.

V are extension-pedals such as described in application Serial No. 662,233, hereinbefore referred to, these pedals being provided with extensions, as described, and shortening the lift of the foot about three inches, as fully explained in my pending application just referred to, enabling the rider in my present construction of bicycle to be mounted directly over the axle of the wheel and to exert to the fullest extent the vertical toggle action of the leg and foot, and hence the rider is enabled, by holding against the handle-bars, to exert great motive force, and for that reason I prefer to use the particular driving-gear mechanism described in my referred-to application for military bicycle, in order that additional strength of construction may be provided to compensate for the additional force applied in the propulsion of the machine.

W is a handle-bar adjustably and rigidly secured to the front tube C of the rear frame by clamping-lever S. X X are handle-bars adjustably secured to the handle-bar heads M, through the medium of screw-threaded shanks A', connected with the handle-bars, and binding-nuts B', the adjacent faces of the heads M and handle-bars X being serrated, as shown.

On the stem O, extending from the heads M of the front handle-bars and below the segmental gear K, is secured a cone-shaped collar C', the outer periphery or edge of which constitutes a flange overhanging a ball-cup D', secured within the tube E of the frame and the interior bracing tubular joint E', and antifriction-balls are located in the race between the collar C' and the ball-cup D', as clearly shown at Fig. 4. Another ball-cup D' is located through the under side of the tube E and strengthening-joint E' and a cone-shaped nut is screwed in place upon threads on the lower end of the stem O, antifriction-balls being located in the race between the ball-cup and nut, and after proper adjustment of the ball-bearings the washer F' and nut P are secured in place, as shown. From this construction and arrangement of the handle-bars on the front section, which of necessity are provided with ball-bearings, as described, it will be seen that by loosening the nuts B' on the ends of the shanks A' the bars X may be drawn forward sufficiently to release the serrations designed to prevent axial movement and that when the serrations are thus released the handle-bars may be turned down vertically and against the opposite sides of the bicycle-frame and that they may be secured in such position by again tightening the nuts B', thus putting them in position for transportation; and, as before stated, this construction and arrangement is necessary to avoid in any manner disturbing the ball-bearings. The rear handle-bars, like all others as at present used, are devoid of ball-bearings, and hence may without inconvenience be removed bodily from the machine when the latter is packed for shipment.

The articulative connection between the lugs G H on the front tube C of the rear frame and the rear tube D of the front frame is made in the following manner: Within the ends of the tube D are arranged short tubular collars G' (see Fig. 4) to constitute shoulders against which ball-cups H' are located. Each end of the pintle-rod I is threaded and a cone-nut J', interiorly and exteriorly threaded, is run onto the end of the pintle-rod I and through the lugs G H to confine the balls between the ball-cups H' and the cone-face of the nuts, and securing-nuts I' are then screwed upon the projecting threaded ends of the rod I, as clearly shown.

I desire to again call particular attention to the fact that each wheel of my improved bicycle is a driving-wheel and to the further fact that where the motive force of both riders is applied to a single wheel, as is the case in tandems as at present constructed, the double application of force tends to and does cause part of the force to be lost in the slipping action of the driving-wheels.

As the motive force applied in my improved wheel is divided between the two wheels, (both of which are drivers,) the entire force of the two riders is effectually expended in propelling the machine.

Having described the construction and arrangement of my improved tandem bicycle and the advantages derived, what I claim as new, and desire to secure by Letters Patent, is—

1. A tandem bicycle composed of two quadrilateral frames each mounted at one end upon a single driving-wheel, and articulatively connected at the upper and lower ends, means for driving each wheel independently, a saddle mounted over the axis of each driving-wheel, handle-bars connected with each frame, and steering mechanism intermediate of one of said handle-bars and the articulative frame adjacent thereto, whereby the machine may be both driven and steered by the two wheels, substantially as hereinbefore set forth.

2. In a tandem bicycle composed of two quadrilateral frames articulatively connected at two points, and each mounted at one end upon an independent driving-wheel, a saddle mounted directly over the axis of each driving-wheel, handle-bars connected with each frame, steering mechanism intermediate of one of said handle-bars, and the articulative frame adjacent thereto, driving mechanism connected with each wheel, and an extension-pedal connected with said driving mechanism, whereby the equilibrium of the two frames is maintained and the force of the riders is applied to the best advantage, substantially as hereinbefore set forth.

3. In a tandem bicycle consisting of two frames, articulatively connected at their upper and lower extremities between the wheels and adapted to be thrown out of the longitudinal plane of the machine, each frame carrying a single driving-wheel, and independent mechanism for driving each of said wheels, a saddle mounted directly over the axis of each wheel, and mechanism for articulating the frames, substantially as and for the purposes set forth.

4. In a tandem bicycle composed of two independent frames articulatively connected at two points centrally of the machine, and each mounted at one end upon an independent driving and steering wheel, means for propelling each wheel independently, handle-bars secured to each frame, one of said handle-bars being pivotally connected with its frame, and means intermediate of the pivotal handle-bar and the next adjacent frame whereby a rider upon one frame is enabled to steer the wheel in the frame upon which the other rider is mounted, substantially as set forth.

5. In combination with the handle-bars X, X and head M mounted in ball-bearings in the tube E, and the tubes C and D, articulatively connected, the segmental gear J extending from the rear frame, and the correspondingly-shaped gear K extending from and secured to the neck or vertical shank of head M, substantially as and for the purpose set forth.

In testimony whereof I affix my signature in presence of two witnesses.

JAMES C. ANDERSON.

Witnesses:
JENNIE G. BOOTH,
SMITH D. FRY.